United States Patent
Tremonti et al.

[11] Patent Number: 5,482,093
[45] Date of Patent: Jan. 9, 1996

[54] AUTOMOTIVE FLUIDS CATCH BASIN

[75] Inventors: Brian M. Tremonti, Bloomfield Hills; Michael S. Belling, Royal Oak; Douglas W. Holmes, Eastpointe; Robert B. Kujawski, Eastpointe, all of Mich.

[73] Assignee: Baytech, Inc., Southfield, Mich.

[21] Appl. No.: 275,769

[22] Filed: Jul. 15, 1994

[51] Int. Cl.⁶ .............................. B65B 1/04; B65B 3/04; B67C 3/02
[52] U.S. Cl. .............................. 141/98; 141/86; 141/331; 141/340; 141/311 A; 184/106; 220/573; 137/312
[58] Field of Search .............................. 141/98, 106, 331, 141/332, 333, 340, 341, 311 A, 342, 86, 88; 220/571, 572, 573, 4.26, 693, 681; 184/106; 137/234.6, 312, 314

[56] References Cited

U.S. PATENT DOCUMENTS

| | | | |
|---|---|---|---|
| 3,156,270 | 11/1964 | Erickson | 141/106 |
| 4,099,598 | 7/1978 | Clinard | 141/340 |
| 4,246,982 | 1/1981 | Pretnick | 184/106 |
| 4,651,887 | 3/1987 | Patrick | 141/98 |
| 4,802,599 | 2/1989 | Hill | 141/98 |
| 4,880,081 | 11/1989 | Congleton | 184/1.5 |
| 4,941,551 | 7/1990 | Visser | 184/106 |
| 4,974,647 | 12/1990 | Eastom | 141/98 |
| 5,033,637 | 7/1991 | Webb | 220/565 |
| 5,143,178 | 9/1992 | Latham, Jr. | 141/340 |
| 5,291,921 | 3/1994 | Devine | 141/86 |

Primary Examiner—Henry J. Recla
Assistant Examiner—Timothy L. Maust
Attorney, Agent, or Firm—Bliss McGlynn

[57] ABSTRACT

A catch basin for automotive fluids, such as oil, adapted for use beneath a mechanic's catwalk which is itself extended beneath an automobile undergoing maintenance or repair operations, is disclosed wherein the catch basin comprises a generally rectangular, planar body portion formed of two dihedrally angled planar body halves and supports for supporting the body portion beneath the catwalk. The basin may be tilted toward a downstream end, at which is located a drain hole and a selectively removable plug. The catch basin supports may be supported from the catwalk or may themselves support the catwalk. The basin may also be provided with a bay adapted to receive and support a plurality of oil filters which are to be drained.

21 Claims, 2 Drawing Sheets

FIG 4
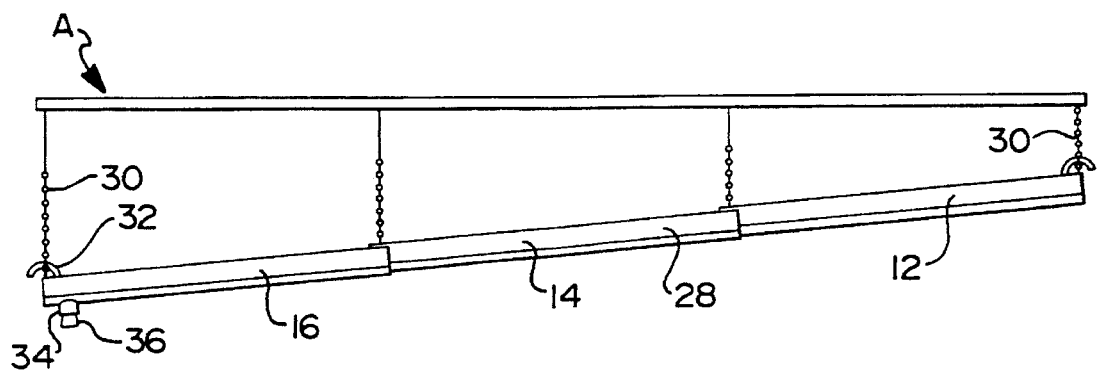
FIG 5
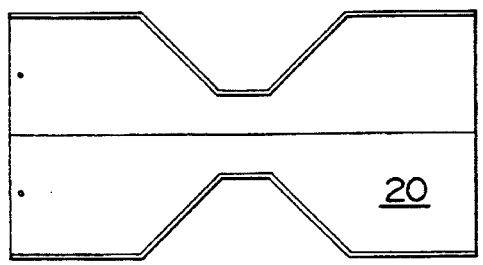
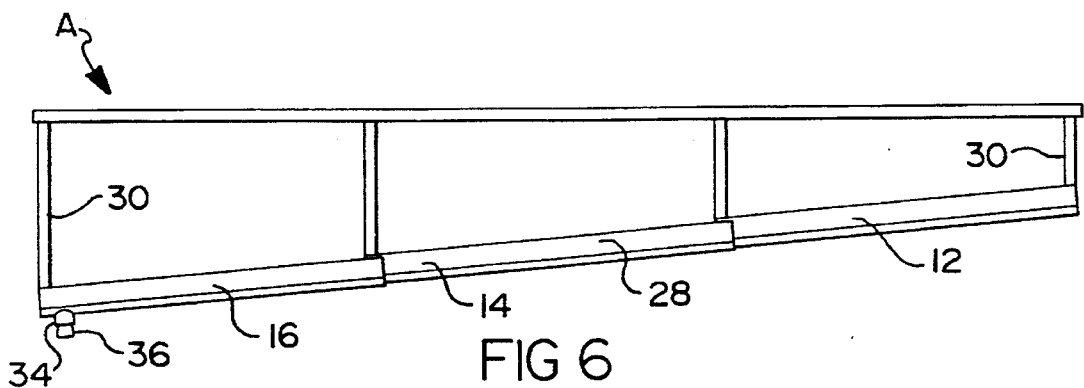
FIG 6

AUTOMOTIVE FLUIDS CATCH BASIN

BACKGROUND OF THE INVENTION

This invention relates generally to a catch pan or catch basin for oil and other automotive fluids and more particularly to a fluid catch pan adapted for placement beneath a catwalk typically found in a subterranean bay over which is placed beneath a vehicle whose oil is to be changed.

Oil drip pans used to catch dripping oil from the location at which an oil filter is removed from a vehicle during an oil change, are known in the art. While such a catch pan can be placed on the work surface beneath an automobile vehicle during such an oil change, it has been typically more convenient to hoist such a vehicle on a pneumatic lift, in which case the oil drip pan is typically elevated to a height generally near the area of the automobile vehicle from which the oil filter has been removed.

U.S. Pat. No. 4,941,551 issued on Jul. 17, 1990 to Visser discloses a "Vehicle Service Area Floor Mat" which is adapted for use beneath a vehicle hoist 36. The invention is provided with a recess center portion 14 as well as a textured apron area 12. A fluid receiving pan 20 is adapted to be received at an end of center portion and requires an operator to remove the pan for drainage. Among other things this does not provide any teaching for adapting an oil catch basin for use with a catwalk.

Concurrently with the growing number of business locations dedicated to offering fast oil changes has come the increasing use of subterranean bays over which the vehicle undergoing an oil change may be placed, the bays then allowing a worker to access the area under the automobile. Typically, such bays are provided with a metal catwalk upon which the worker stands, the catwalk allowing oil and other motor vehicle fluids to drain through, thus eliminating the possible formation of slippery and dangerous pools of such fluids. While the prior art oil drip pan, typically elevated to the area immediately beneath the location from which the oil filter is removed, may be used with such a catwalk, its use is not convenient. Even with use of such of an oil drain pan, nonetheless, there may be casual spillage of oil and other automobile fluids.

The clean up of such casual spillage from the area around and beneath the catwalk is cumbersome and is made more inconvenient by the typically confined space. Additionally, the increasing number of restrictions governing handling during clean up and disposition of such environmentally threatening waste required under tightening environmental legislation adds to the effort and expense of such clean up and disposition.

Accordingly, it is an object of the present invention to minimize or eliminate the efforts and expenses associated with clean up of spills of oil and other automotive fluids during vehicle maintenance operation. It is a further objective of the present invention to facilitate or eliminate the efforts associated with clean up of oil and other automotive fluids by providing a device compatible for use with a catwalk typically used in association with a subterranean pit over which a motor vehicle undergoing maintenance operation may be placed.

It is yet another objective of the present invention to provide an oil catch basin capable of supporting a cat walk on which maintenance personnel may stand while performing maintenance operation beneath a motor vehicle.

SUMMARY OF THE INVENTION

The subject invention provides an oil catch basin capable of use in association with a catwalk typically provided across the bottom surface of a subterranean pit over which the motor vehicle undergoing maintenance is placed. The oil catch basin, which may be manufactured in a plurality of separate sections later joined into a single, properly sized unit in place beneath a catwalk, is provided with a main body portion surrounded by a fluid retaining lip. The body portion may be creased along a longitudinal, generally medial axis to form a dihedral angle between generally planar sections of the body portion such that oil or other automotive fluids flow down into the trough formed by the dihedral angle. Further, when positioned beneath the catwalk, the main body portion of the oil catch basin is tilted towards a first, downstream end. Alternative embodiments of the invention may be positioned beneath the catwalk by alternative means including being suspended from the catwalk, being supported by support arms placed into the walls of the subterranean pit, or resting directly on the floor or other bottom surface in the pit. With all alternative embodiments for supporting the catch basin beneath the catwalk, it is preferred that the main body portion be tilted downwardly towards a first, downstream end.

At the first, downstream end of the body portion, at the dihedral angle which forms a trough, is provided a drain hole with a selectively removable plug, allowing selective drainage of collected fluid from the trough when desired. Additionally, at least one side of the body portion may be provided with an oil filter drainage area. The oil filter drainage area, referred to as the oil filter bay, includes a chute extending some appropriate distance beyond the edge of the main body portion, the chute providing access to an area bordered by at least one retaining wall. The retaining wall may be relatively low so long as it is of adequate height to support an oil filter in a relatively upright position while the oil filter rests against the tilted surface of the body portion.

In alternative embodiments in which the oil filter bay is bordered by a plurality of retaining walls, appropriate gaps are provided within or between the retaining walls to allow drainage of the oil toward the trough and toward the downstream end of the body portion.

DETAILED DESCRIPTION OF THE DRAWINGS

FIG. 4 shows a side view of an embodiment of the present invention in place beneath a catwalk.

FIG. 5 shows a top view of an alternate embodiment of the present invention.

FIG. 6 shows a side view of an alternative embodiment of the present invention in which the supports support the catwalk.

DETAILED DESCRIPTION

Figure 1:
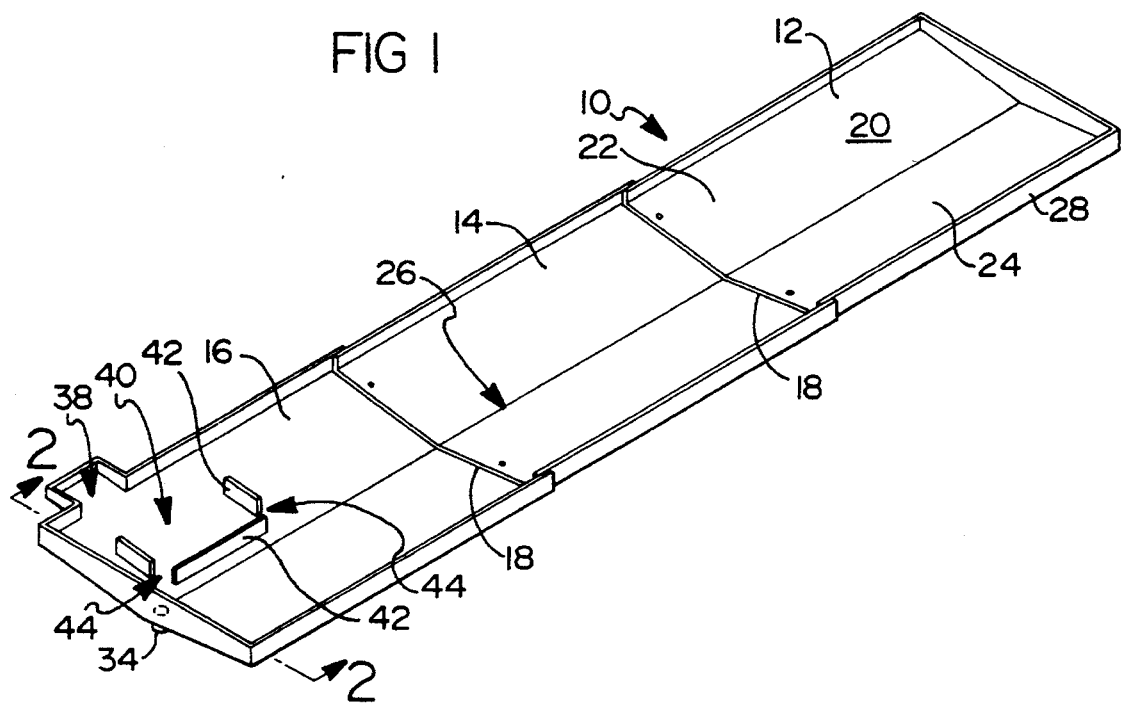
FIG. 1 is a perspective view of the oil catch basin of the present invention.

The oil catch basin of the present invention is a large, generally rectangular planar structure as shown in FIG. 1. The present invention is adapted to fit beneath a catwalk, as shown in FIG. 4, which is now typically used to support a worker who is in a subterranean pit while working on maintenance of a motor vehicle, such as an oil change.

As shown in FIG. 1, an oil catch basin 10 may be formed of a plurality of subsections, which in this embodiment are the three subsections 12, 14, and 16. The formation of the catch basin 10 out of a plurality of subsections such as 12, 14, and 16, facilitates the packaging and transportation of the catch basin to its intended site of use and additionally facilitates the placement of the catch basin in appropriate position beneath a catwalk. Equally importantly, formation of the catch basin 10 from a plurality of subsections also allows facility in sizing the length of the catch basin to correspond appropriately to the length of the catwalk underneath which the catch basin will be used. Once subsections 12, 14, and 16 are placed beneath the catwalk the appropriate amount of overlay of subsection 12 across subsection 14, or subsection 14 across subsection 16 may be achieved to size the catch basin so it extends slightly beyond the edges of the catwalk to the appropriate degree desired to accomplish this purpose of catching essentially all motor vehicle fluid which might drip from the underside of the motor vehicle undergoing maintenance operations.

Once the appropriate amount of overlap of the subsections is achieved, the edges of the overlapping subsections are sealed at seams 18 by an appropriate, fluid tight sealing method to maintain the fluid type integrity of the catch basin. Such an appropriate fluid type sealing means might be accomplished by screws fixed at appropriate locations of overlap between two adjacent subsections to secure their positions relative to each other and then caulking the seam 18 along its length. Alternative means of fixing and sealing the seams 18 between the subsections 12 and 14 or 14 and 16 are known to the art and are to be understood to fall within the scope of the invention. Furthermore, selection of appropriate means of securing adjacent subsections and sealing the seams 18 therebetween may depend on the material used to form the basin 10. Thus, where basin 10 is formed of a plastic material, which is presently the preferred material, the means of securing adjacent subsections and sealing seams 18 may be the same, namely fusing of the plastic of the subsections in situ once the appropriate overlapping and sizing is achieved. Where the basin 10 is formed of other material, such as a sheet metal, other means for both securing adjacent subsections and sealing seams 18, as known in the art relevant to that material, may be used.

The oil catch basin 10 has a generally rectangular, planar body portion 20 which is preferably formed of two dihedrally angled planar body halves 22 and 24. The dihedrally angled planar body halves 22 and 24 are angled downwardly to form a trough 26 which runs along a longitudinal, generally medial axis of the main body portion 20. As seen in the sectional view of FIG. 2, the dihedral angle between body halves 22 and 24 may be pitched downwardly approximately ten degrees, although the angle between the body halves 22 and 24 is not critical so long as there is sufficient angle to direct the flow of oil or other automotive fluids downward into the trough 26. Catch basin 10 may also be provided with a wall or lip 28 around its perimeter, again to enhance the ability of the catch basin to capture the greatest amount of automotive fluids which may drip from the automobile undergoing maintenance.

Figure 2:
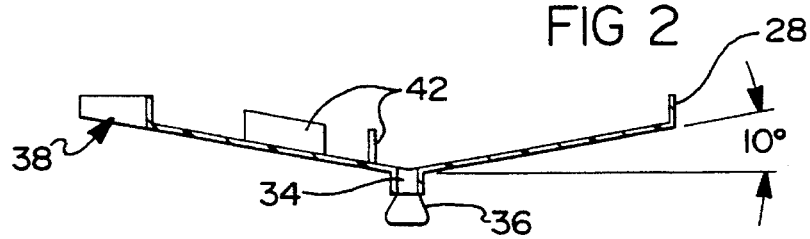
FIG. 2 is a section view, taken along line 2—2 of FIG. 1, illustrating the drain hole and oil filter bay of an embodiment of the present invention.

Catch basin 10 is also provided with supports 30, generally located at least at the corners of body portion 20. As shown in the embodiment of FIGS. 1 and 2, the supports 30 may be received in a support receiver 32 which may be located on lip 28. In this preferred embodiment, each of supports 30 may be a length of chain ending in an S hook and support receivers 32 may be an eyelet such that the S hook at the end of chain 30 fits into the support receiver or eyelet 32. Alternative support methods, including a rigid support rod 30 pivotally riveted into a support receiver hole 32 also falls within the scope of the invention. Furthermore, the precise location of support receiver 32 is not necessarily limited to lip 28, and may alternatively be on the outside of lip 28 or actually in planar body 20 so long as the pluralities of support receivers 32 and supports 30 support oil catch basin 10 in its appropriate position beneath catwalk.

As seen in FIG. 4, it is also a feature of the preferred embodiment of the invention that catch basin 10 be tilted downwardly along its longitudinal axis towards a first downstream end, again to direct the flow of fluid towards a fixed point, namely drain 34. To accomplish this, supports 30 located at the first, downstream end, at which is located drain hole 34 may be of greater length than supports 30 located at the second, upstream end. Again, as seen in FIG. 4, supports 30 may be supported directly from catwalk A.

Alternative embodiments of support 30 may also be supported either on the floor of the work area or on the walls of the work area where the work area is a subterranean pit over which an automobile is placed to allow access to its underside for maintenance operation. Where the supports 30 are supported on the floor of the work area, the catch basin 10 may also be provided with anchor means to anchor catch basin 10 in operative position beneath the automobile. Additionally, one embodiment of the invention may provide supports 30 with sufficient strength that they in turn support catwalk A above catch basin 10 with sufficient strength to allow an automobile maintenance person to stand on the catwalk during maintenance operations.

As previously mentioned, a drain hole 34 is located at a first, downstream end of oil catch basin 10 and is provided with a selectively removable plug 36. In operation, appropriate fluid receiving receptacles are positioned appropriately relative to drain hole 34 and plug 36 is then removed allowing the flow of oil or other automobile fluids into the appropriate receiving receptacle for proper handling and disposal. An appropriate fluid receiving receptacle may simply be positioned beneath the drain hole, with gravity causing fluid to drip from catch basin 10 into the receptacle or a hose may be placed on drain hole 34 with the other end of the hose leading to an appropriate fluid receiving receptacle.

Figure 3:
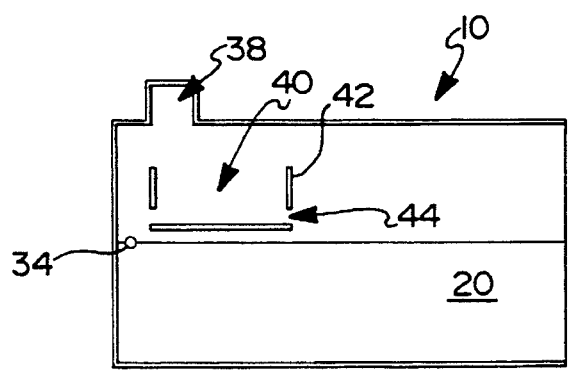
FIG. 3 shows a top view along of an embodiment of the oil catch basin of the present invention.

Oil catch basin 10 may also be provided with an access chute 38 which allows access to an oil filter bay generally indicated at 40. The oil filter bay 40 may be defined by one or more retaining walls 42 of sufficient height to support an oil filter resting against it. It should be noted that the oil filter is resting on angled body halves 22 and thus is tilted and requires support against gravity. In a preferred embodiment shown in FIGS. 1 and 3, oil filter bay 40 comprises three retaining walls 42 and a fluid passable gap 44 is provided between the walls 42 to ensure that oil or other automotive fluids may flow unhindered to the lowest point of the catch basin 10, namely the drain hole 34. Access chute 38 is sized and positioned so that it extends a sufficient amount beyond the edge of catwalk A to allow maintenance personnel to remove the oil filter from the automobile, move the oil filter beyond and below the edge of catwalk A through the access chute 38 into oil filter base 40, where the oil filter may be inverted for drainage. Access chute 38 insures that any incidental oil leakage during positioning of an oil filter to be drained again is within the perimeter of catch basin 10 thus reducing or eliminating incidental spillage onto the floor of the work area which would otherwise require effort and expense and clean up.

As many other modifications of the present invention may be understood in light of the above teachings, it should be appreciated that the invention is not to be limited by the description provided above.

We claim:

1. A catch basin for automotive fluids adapted for use beneath a mechanic's catwalk which is itself extended beneath an automobile undergoing maintenance or repair operations, said catch basin comprising:

a generally rectangular, planar body portion formed of two dihedrally angled planar body halves, said dihedral angle generally along a longitudinal, generally medial axis of said rectangular body portion, said body halves angled downwardly to form a trough; and supports for supporting said body portion from the catwalk.

2. The catch basin of claim 1 wherein said body portion is formed of a plurality of subsections, each subsection joined to the others along a fluid-tight seam.

3. The catch basin of claim 1 wherein said supports are also capable of tilting said catch basin along said longitudinal axis toward a first, downstream end of said basin.

4. The catch basin of claim 1 further comprising a drain hole positioned at a first, downstream end of said body portion along said dihedral angle, said drain hole adapted to selectively receive a plug.

5. The catch basin of claim 4 further comprising a selectively removable plug removably inserted in said drain hole.

6. The catch basin of claim 4 further comprising an upwardly projecting lip around the perimeter of said body portion.

7. The catch basin of claim 6 wherein said body portion includes:

an oil filter bay access chute comprising a generally rectangular flange portion extending outwardly beyond an edge of a side of said body portion; and an oil filter bay comprising at least two retaining walls angled with respect to each other at a downstream point nearest said longitudinal, generally medial axis and having a fluid-passable gap at said downstream point, said oil filter bay located adjacent and medially of said oil filter bay access chute.

8. The catch basin of claim 6 wherein said body portion has a set of support receptors, at least one support receptor positioned at each corner of said body portion and wherein at least one of said supports is positioned at each corner of said body portion, a first end of each of said supports connectable to said the catwalk and a second end of each of said supports connectable to said support receptor.

9. The catch basin of claim 8 wherein said supports located at the two corners of a first, downstream end of said body portion are longer than said supports located at a second, upstream end of said body portion, whereby said body portion is tilted down along said longitudinal axis toward said first, downstream end.

10. The catch basin of claim 4 wherein said body portion includes:

an oil filter bay access chute comprising a generally rectangular flange portion extending outwardly beyond an edge of a side of said body portion; and an oil filter bay comprising at least two retaining walls angled with respect to each other at a downstream point nearest said longitudinal, generally medial axis and having a fluid-passable gap at said downstream point, said oil filter bay located adjacent and medially of said oil filter bay access chute.

11. The catch basin of claim 4 wherein said body portion has a set of support receptors, at least one support receptor positioned at each corner of said body portion and wherein at least one of said supports is positioned at each corner of said body portion, a first end of each of said supports connectable to said the catwalk and a second end of each of said supports connectable to said support receptor.

12. The catch basin of claim 11 wherein said supports located at the two corners of a first, downstream end of said body portion are longer than said supports located at a second, upstream end of said body portion, whereby said body portion is tilted down along said longitudinal axis toward said first, downstream end.

13. The catch basin of claim 1 further comprising an upwardly projecting lip around the perimeter of said body portion.

14. The catch basin of claim 1 wherein said body portion includes:

an oil filter bay access chute comprising a generally rectangular flange portion extending outwardly beyond an edge of a side of said body portion; and an oil filter bay comprising at least two retaining walls angled with respect to each other at a downstream point nearest said longitudinal, generally medial axis and having a fluid-passable gap at said downstream point, said oil filter bay located adjacent and medially of said oil filter bay access chute.

15. The catch basin of claim 1 wherein said body portion has a set of support receptors, at least one support receptor positioned at each corner of said body portion and wherein at least one of said supports is positioned at each corner of said body portion, a first end of each of said supports connectable to said the catwalk and a second end of each of said supports connectable to said support receptor.

16. The catch basin of claim 15 wherein said supports located at the two corners of a first, downstream end of said body portion are longer than said supports located at a second, upstream end of said body portion, whereby said body portion is tilted down along said longitudinal axis toward said first, downstream end.

17. The catch basin of claim 1 wherein said supports are themselves supported from the catwalk.

18. A catch basin adapted for use beneath a mechanic's catwalk which is itself extended beneath an automobile undergoing maintenance or repair, said catch basin comprising:

a generally rectangular, planar body portion formed of two dihedrally angled planar body halves, said dihedral angle generally along a longitudinal, generally medial axis of said rectangular body portion, said body halves angled downwardly to form a trough;

an upwardly projecting lip around the perimeter of said body portion;

supports for supporting the catwalk in operative position above said catch basin.

19. The catch basin of claim 18 further comprising anchor means to anchor said catch basin in operative position beneath the automobile undergoing maintenance operations.

20. A catch basin for automotive fluids adapted for use beneath a mechanic's catwalk which is itself extended beneath an automobile undergoing maintenance or repair operations, said catch basin comprising:

a generally rectangular, planar body portion; and supports for supporting said body portion from the catwalk.

21. A catch basin for automotive fluids adapted for use beneath a mechanic's catwalk in a walled, subterranean pit, the catwalk itself extended beneath an automobile undergoing maintenance or repair operations, said catch basin comprising:

a generally rectangular, planar body portion; and supports for supporting said body portion from the walls of the pit whereby the catch basin is operatively positioned beneath the catwalk.

* * * * *